Jan. 25, 1966   R. H. FAIRBANK ETAL   3,230,694
SELF-PROPELLED SWATHER

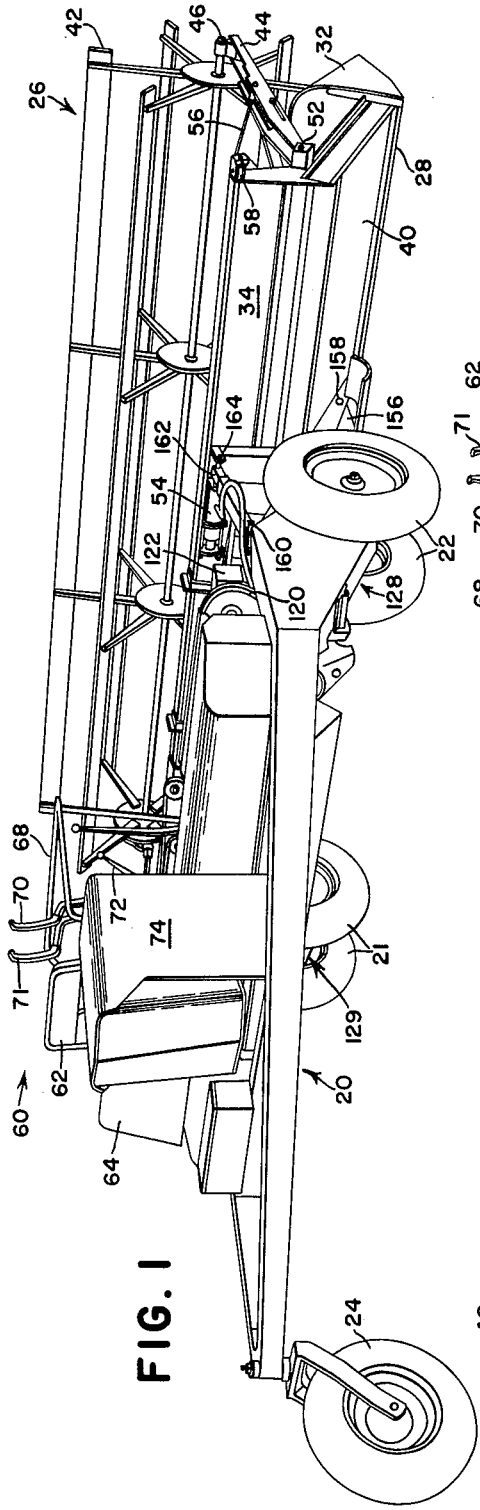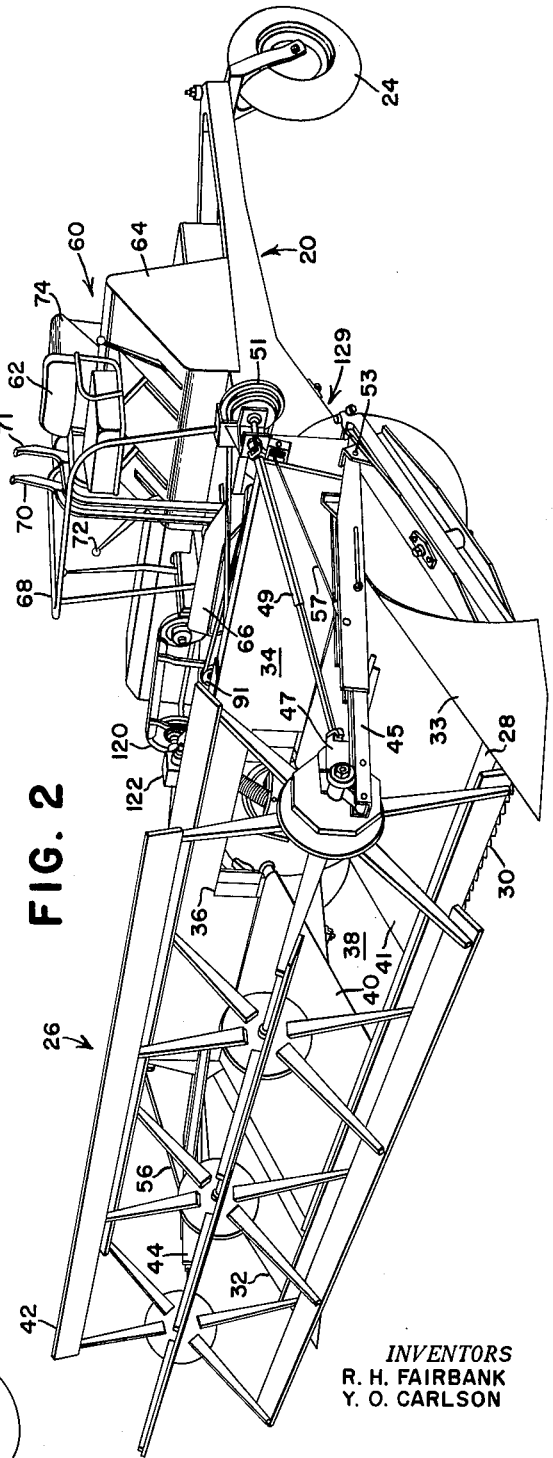

Filed Oct. 11, 1961   4 Sheets-Sheet 2

INVENTORS
R. H. FAIRBANK
Y. O. CARLSON

Jan. 25, 1966    R. H. FAIRBANK ETAL    3,230,694
SELF-PROPELLED SWATHER
Filed Oct. 11, 1961    4 Sheets-Sheet 3
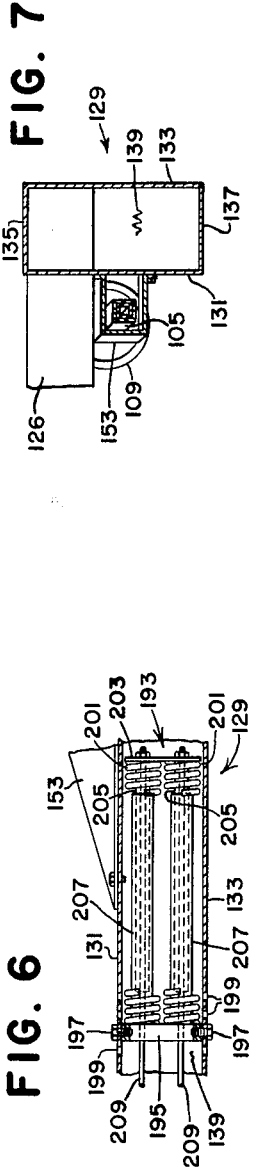
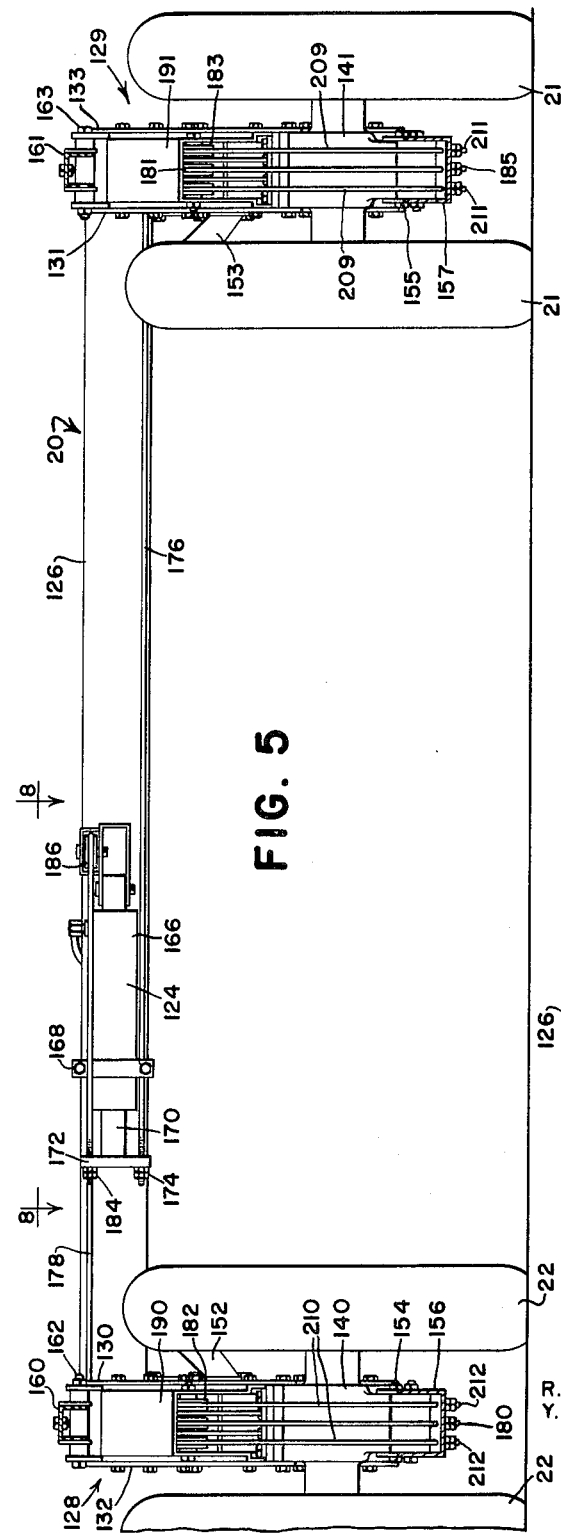
INVENTORS
R. H. FAIRBANK
Y. O. CARLSON Jan. 25, 1966  R. H. FAIRBANK ETAL  3,230,694
SELF-PROPELLED SWATHER Filed Oct. 11, 1961  4 Sheets-Sheet 4

INVENTORS
R. H. FAIRBANK
Y. O. CARLSON

United States Patent Office 3,230,694
Patented Jan. 25, 1966

3,230,694
SELF-PROPELLED SWATHER
Raymond H. Fairbank, Moline, and Yngve O. Carlson, East Moline, Ill., assignors to Deere & Company, Moline, Ill., a corporation of Delaware
Filed Oct. 11, 1961, Ser. No. 144,465
12 Claims. (Cl. 56—23)

This invention relates to an agricultural machine and more particularly to a combination vehicle and harvester. In the particular embodiment illustrated, the machine is what is known as a self-propelled windrower.

Those familiar with machines of this character and versed in the operation thereof will recognize the desirability in such machine of light weight, low cost and a high degree of maneuverability and flexibility in operation. Experience has shown that these ends are best attained by a specialized construction departing in many instances from what would be regarded as conventional design in heavier machines, such as tractors and the like. Because of cost and weight factors, many problems arise not only in the design and manufacture of the vehicle or chassis itself but also in the support and adjustment of the harvesting device utilized therewith.

According to the present invention, the principal object is to provide an improved machine of the character noted. Further and important objects reside in the arrangement of the front wheel supports and the means for mounting on the frame a harvesting device such as a windrower platform, in conjunction with means for raising and lowering the platform. It is also an object of the invention to provide improved front end structure for such vehicle in which certain wheel-supporting components, as well as harvester platform adjusting and counterbalancing components, are compartmentalized.

The foregoing and other important objects and desirable features inherent in and encompassed by the invention will become apparent as a preferred embodiment thereof is discosed in detail in the ensuing description and accompanying sheets of drawings, the figures of which are described below:

FIG. 1 is a perspective view of the machine as seen from the right rear thereof.

FIG. 2 is a similar perspective as seen from the left front thereof.

FIG. 5 is a front view, partly in section as would be seen on the line 5—5 of FIG. 3.

FIG. 6 is a section as seen along the line 6—6 of FIG. 3.

FIG. 7 is a section as seen along the line 7—7 of FIG. 3.

FIG. 8 is a fragmentary plan as seen along the line 8—8 of FIG. 5.

Figure 3:
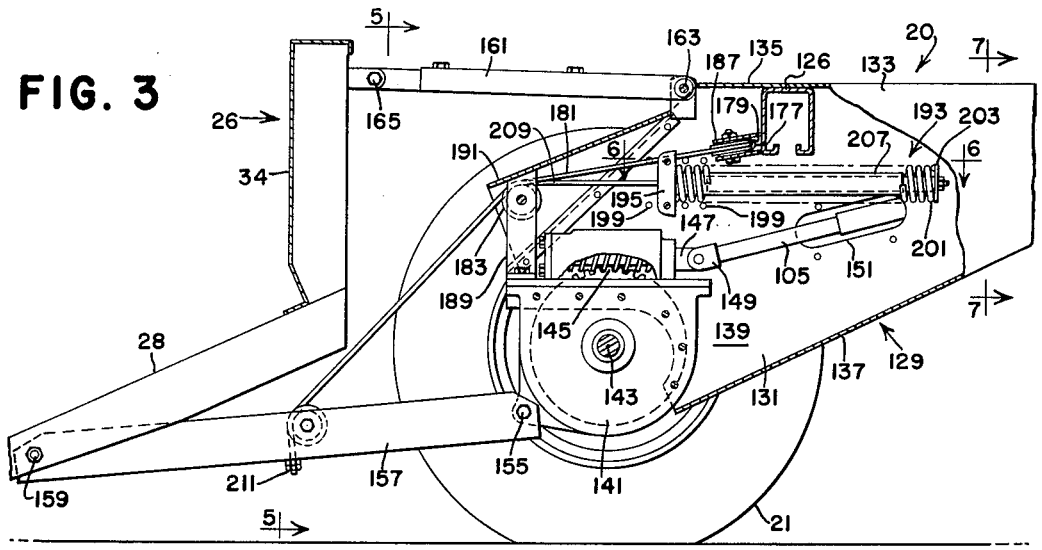
FIG. 3 is an enlarged fragmentary view, partly in section, of a left-hand front portion of the machine, illustrating the left-hand wheel support and related components, one of the dual left-hand wheels being removed for clarity.
Figure 4:
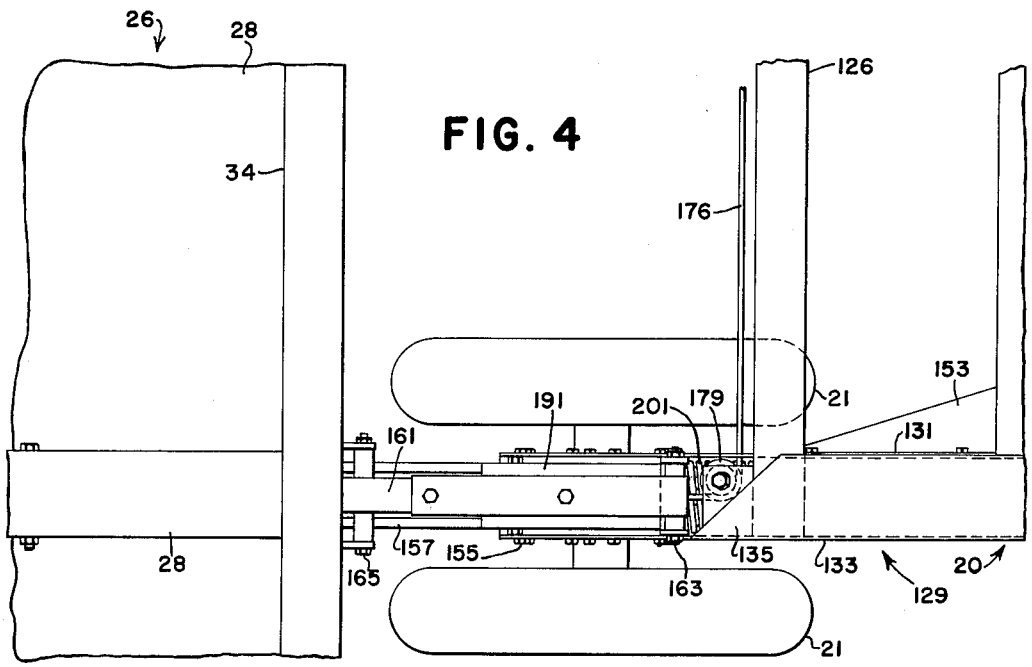
FIG. 4 is a fragmentary plan view of the structure shown in FIG. 3.

Reference will be had first to FIGS. 1 and 2 for a general explanation of the machine. In these figures, the numeral 20 designates a fore-and-aft main frame or chassis, supported at its front end on left and right front wheels 21 and 22. In the case of each wheel means, dual wheels are illustrated, but this is without particular significance. The rear end of the frame 20 is supported on a single caster wheel 24. The main frame or chassis 20 is generally triangular as seen from above and the forward or front portion of the frame supports thereon, in a manner to be described in detail later, a harvester or harvester device, here of the windrower type designated in its entirety by the numeral 26. As is typical of machines of this nature, the harvester comprises a platform or header 28 having a transverse leading edge provided with cutting mechanism, best indicated at 30 in FIG. 2. The header is delineated at opposite ends by right and left hand dividers 32 and 33 and is further defined at its rear end by a transverse upright rear wall 34, the central portion of which is notched or cut out at 36 to register fore and aft with a central discharge opening 38 which is defined by the transversely spaced apart fore-and-aft edges of transversely oppositely inwardly running endless aprons or conveyors 40 and 41 which are trained about rollers running on upwardly and rearwardly inclined fore-and-aft axes, as is conventional, for receiving cut grain moved rearawrdly over the cutting mechanism 30 by a rotating reel 42, which is supported on the header by right and left-hand reel support arms 44 and 45. In general, this construction may be regarded as typical of usual windrower construction, the theory of operation being that the grain is cut by the relatively wide cutting mechanism 30, is received by the inwardly running conveyors or aprons 40, 41 and is deposited via the discharge opening 38 back onto the stubble remaining from the cut grain, the deposited grain being thus formed in a windrow running lengthwise of the field or parallel to the line of travel of the machine, it being clear that the front wheels 21 and 22 straddle such windrow.

In the particular machine shown, the reel 42 rotates on a transverse shaft 46 journalled at its opposite ends respectively on the forward extremities of the reel support arms 44 and 45. The drive means for the reel includes suitable gearing (not shown) in a small gear box 47 mounted at the forward end of the left-hand reel support arm 45. A drive shaft 49, which is telescopic to accommodate adjustment of the reel relative to the cutting mechanism 30, is driven by belt and sheave means 51 in a manner to be subsequently described. The reel support arms 44 and 45 are pivoted respectively on transversely coaxial pivots 52 and 53 to rear side portions of the header and thus are capable of vertical swinging to vary the height of the reel 42 relative to the cutting mechanism 30. In the present case, veratical adjustment is accomplished by force-exerting means including a hydraulic cylinder and piston assembly 54, located on the rear side of the back wall 34 of the header (FIG. 1) and having right and left hand cable connections 56 and 57 with the reel support arms 44 and 45, respectively. The portions of the cable that are connected to the cylinder and piston assembly 54, although not shown, extend along the rear marginal edge of the rear wall 34 and opposite portions thereof, as represented by the portions 56 and 57, are trained about appropriate sheaves, as suggested at 58 in FIG. 1. Here again, these details do not in any way limit the present invention and are described merely for environmental purposes.

The machine is guided over the field by an operator who occupies an operator's station designated in its entirety by the numeral 60. This station includes a suitable seat 62 mounted on a seat support 64 rearwardly of an operator's platform 66 which is delineated at its front and right by a railing 68. The controls for the machine are conveniently grouped at the station, and those of any significance here are illustrated as comprising right and left steering control levers 70 and 71 and a speed control lever 72. The machine may be powered in the first instance by any suitable internal combustion engine, that here being enclosed in an engine hood 74. This engine is shown schematically at 76 in FIG. 9 as having a power output shaft 78 to which is keyed a sheave 80 from which the drive is taken to the belt and sheave means 51 for the reel driving shaft 49. In the present case, the sheave 80 is belted at 81 to an intermediate dual sheave 83 which in turn is belted at 85 to a sheave 87 that is keyed to a shaft 89 which ultimately is connected to a sheave 91 (FIG. 2) which forms part of the belt and sheave means 51. Here again, the drive is only typical of many that could be employed.

Figure 9:
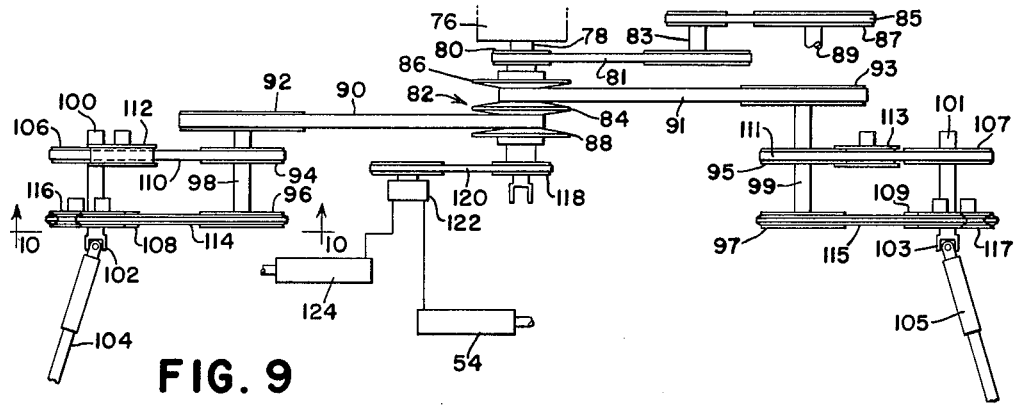
FIG. 9 is a schematic plan view of the drive.
Figure 10:
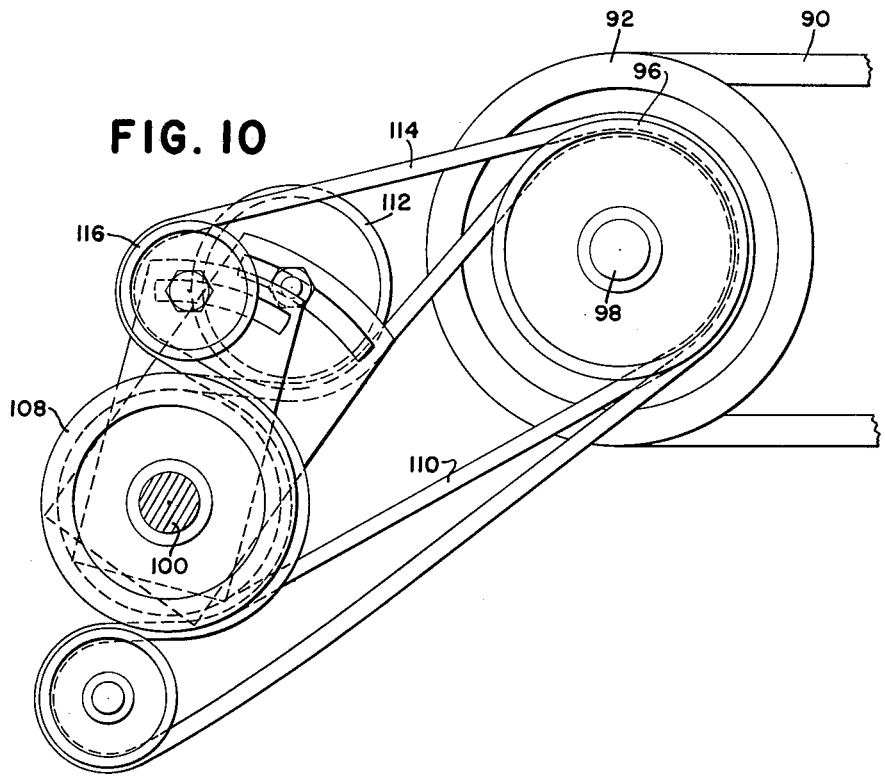
FIG. 10 is an enlarged front view, partly in section, as seen along the line 10—10 of FIG. 9.

Continued reference will be had to FIGS. 9 and 10 for the purpose of explaining the drive. The power output shaft 78 of the engine 76 has keyed thereto a dual variable-speed sheave 82, which may be of the type having a central part 84 keyed to and axially nonshiftable on the shaft 78, plus opposite side parts 86 and 88 which, although rotatable with the shaft, are axially shiftable along the shaft. That portion of the sheave 82 between the sheave portions 84 and 88 is connected by a right hand drive belt 90 to a sheave 92 which is one of three, including additional sheaves 94 and 96, keyed to a fore-and-aft right-hand shaft 98. The other sheave portion—between the sheave sections 84 and 86—is connected by a left hand drive belt 91 to a left hand sheave 93 which is one of three, including additional sheaves 95 and 97, keyed to a left hand drive shaft 99.

The sheave assembly 82 may be of the type shown in the U.S. Patent to Curtis 2,595,229, in which the sheave sections 86 and 88 have selectively shiftable phasses relative to the central sheave section 84. That is, in one phase, both sections 86 and 88 may be shifted simultaneously but in opposite directions toward or away from the central section 84, which will result in identical changes in diameters of the effective sheave drive portions. For example, if both sections 86 and 88 are shifted toward the central section 84, the effective driving diameters for the belts 90 and 91 will increase at the same rate. Conversely, if both sections are shifted away from the central section 84, the effective drive diameters for the belts 90 and 91 will decrease at the same rate. In the other phase, the sections 86 and 88 may be shifted simultaneously but in the same direction; that is, with one section moving toward the central section and the other section moving away from the central section. This means that the effective drive diameter at one side of the central section will increase and that at the other side will proportionately decrease. Since this is fully disclosed in the Curtis patent mentioned, further description here is deemed to be unnecessary. Suffice it to note that the arrangement is such that the drive to both belts 90 and 91 may be simultaneously increased or decreased or the speed of one may be increased while the other is proportionately decreased. This will of course affect the relative speeds of rotation of the shafts 98 and 99. It will be further understood that the sheaves 92 and 93 are of the spring-loaded variable-diameter type so that changes in effective diameter of the sheave portions between the sections 84 and 86 and 84 and 88 will be accommodated without undue stretching of the belts 90 and 91.

At the right hand side of the machine there is a fore-and-aft power shift 100 which is connected by a universal joint 102 to a forwardly projecting telescopic drive shaft 104 that angles forwardly and outwardly and is ultimately connected in such manner as to drive the right hand wheels 22, the details of which will be set forth later. Keyed to the shaft 100 for rotation therewith are forward and reverse sheaves 106 and 108 respectively. A forward drive belt 110 is trained about the sheaves 94 and 106, enveloping the two sheaves in conventional fashion as shown in FIG. 10. A controllable idler 112 operates on the upper run of the belt 110 to serve a clutching function by being effective to tighten or loosen the belt 110 as between the sheaves 94 and 106. For example, when the belt 110 is tightened by movement of the sheave 112 downwardly and inwardly as seen in FIG. 10, the drive between the sheaves 94 and 106 is established. When the idler or tightener sheave 112 is moved in the opposite direction, the belt 110 becomes loose and drive between the sheaves 94 and 106 is discontinued.

A reverse driving belt 114 is used between the sheaves 96 and 108, and this is employed in conjunction with a tightening idler sheave 116, but in this case a portion of the reverse drive belt 114 has a reverse wrap on the sheave 108. Therefore, when the idler 116 is swung outwardly as seen in FIG. 10, the belt 114 is tightened and, because of the reverse wrap, the direction of rotation of the sheave 108 is reversed as respects that of the sheave 96. Conversely, when the sheave 116 is shifted inwardly, the belt 114 is relaxed and therefore will not transmit drive between the sheaves 96 and 108. It is obvious of course that the two idler or tightener sheaves 112 and 116 are coordinated so that as one moves inwardly, it is followed by the other, and vice versa. That is to say, when the two sheaves together are moved inwardly, as to effect tightening of the forward drive belt 110 by the idler sheave 112, the idler sheave 116 for the reverse belt 114 also moves inwardly and therefore loosens the reverse drive belt 114. The converse is also true. Therefore, the shaft 100, which ultimately leads to the right hand wheels 22, is capable of being selectively driven either forwardly or reversely.

The same general arrangement is provided in symmetrical fashion at the left hand side of the machine, wherein a power shaft 101, comparable to the shaft 100, is provided with a universal joint connection 103 to a forwardly and outwardly angled drive shaft 105 which leads ultimately to the left hand wheels 21. Keyed to the shaft 101 are forward and reverse sheaves 107 and 109. A left hand forward drive belt 111 is trained about the sheaves 95 and 107, in conjunction with tightening idler 113; and a left hand reverse drive belt 115 interconnects the sheaves 97 and 109, in conjunction with a tightening idler 117. The control or tightener sheaves 113 and 117 are arranged to operate on under portions of the belts 111 and 115 so as to be capable of being coordinated with the control sheaves 112 and 116, which may be tied to the control levers 70 and 71, previously described. One of these levers and the speed control lever 72 may be connected in any suitable manner to the sheave 82. As already pointed out, the Curtis patent discloses the basic idea of the dual functioning of the sheave 82. The patent to Adkins 1,197,090 discloses the basic idea of alternating between forward and reverse belts. At any rate, the drive illustrated here forms no part of the present invention, but since it is embodied in the commercial machine, it is described as representative of a power source for supplyng power to the front wheels 21 and 22, which is significant in the present disclosure from the standpoint of the power train, the means for driving the wheels, and other components associated with the supporting and adjusting of the harvester 26.

The power shaft 78 of the internal combustion 76 may of course be used for driving other components of the machine. In the present case, there is illustrated at the forward end of the shaft 78 a power output sheave 118 which, by means of a belt 120, drives a hydraulic pump 122 for furnishing fluid under pressure to the reel adjusting cylinder and piston assembly 54 as well as to another cylinder and piston assembly 124 for adjusting the vertical position of the header or harvester 26, the details of which will be set forth below.

The main frame 29 has its front end defined by a transverse frame member 126, which is preferably a member of substantial strength and which is rigidly secured at oposite ends to right and left hand wheel support structures designated respectively at 128 and 129. Since the structure 129 is best illustrated, it will be described first, reference being had to FIGS. 3 through 7.

This structure includes basically a box-like part having inner and outer, upright, fore-and-aft and closely transversely spaced apart sidewalls 131 and 133 which, together with top and bottom walls 135 and 137, afford a compartment 139. This compartment opens forwardly and downwardly and thus is able to accommodate a gear box 141 which contains a transverse wheel shaft 143 which projects transversely oppositely beyond the walls 131 and 133, and thus exteriorly of the compartment 139, for connection to the dual left hand wheels 21 (FIG. 5). The gear box contains suitable gearing, as at 145 (in the broken away portion of FIG. 3) having a fore-and-aft input shaft 147 which has at its rear end a universal joint connection 149 with the forward end of the previously described forwardly and outwardly angled drive shaft 105. The inner side wall 131 is provided with an aperture 151 which is shaped and dimensioned to accommodate entry of the shaft 105 into the compartment 139. Inwardly of the wall 131, there is provided an enclosure 153 which encloses the exterior portion of the shaft 105 ahead of the drive sheave 109.

The other wheel support structure 128 at the right hand side of the machine is identically constructed, having side plates 130 and 132 respectively similar to the plates or walls 131 and 133 and likewise affording a right hand compartment (not shown, but clearly present on the basis of the duplication of structure) in which is mounted on right hand gear housing 140 containing a wheel shaft (not shown, but similarly clearly present) for connection to the right hand wheels 22. As in the case of the inner left hand side wall 131, the inner right hand side wall 130 is apertured (not shown) to accommodate the forwardly and outwardly angled drive shaft 104, and again an exterior enclosure 152, like that at 153, is provided to accommodate that portion of the shaft 104 ahead of its sheave 108.

The right and left hand gear housings 140 and 141 are provided respectively at lower forward portions thereof with transversely coaxial pivot means 154 and 155, and these serve respectively to pivotally mount the rear ends of fore and aft lower links 156 and 157. The forward end of the link 157 is pivotally connected to the harvester platform 28 as at 159. A similar pivotal connection is effected at 158 (FIG. 1) between the forward end of the right hand link 156 and the right hand portion of the header 28. Since each gear box 140 and 141 is rigidly secured to the box-like part made up of the associated walls, as at 131, 133, 135 and 137 for the left hand structure 129, the gear boxes in effect become parts of said structures and therefore the harvester, via the links 156 and 157 is supported by the frame through the medium of the structure 128 and 129.

Similarly, the structures afford support for the upper portions of the header or platform by means including right and left hand upper links 160 and 161 which are generally parallel with the lower links 156 and 157. In the case of the link 160, the right hand structure 128 is provided with upper transverse pivot means 162 which carries the rear end of the link, and the forward end of the link is pivotally connected at 164 (FIG. 1) to an upper rear portion of the harvester. The rear end of the left hand upper link 161 is pivotally connected at 163 to the upper forward portion of the left hand structure 129, and the forward end of this link is pivotally connected to an upper left hand rear portion of the harvester on a transverse pivot axis at 165. Each of the top links may be made adjustable as to length, by the means illustrated.

Reference has previously been made to the cylinder and piston assembly 124 as representative of a force-exerting device for effecting vertical adjustment of the header relative to the frame 20. As best shown in FIGS. 5 and 8, this device has its cylinder 166 rigidly affixed to the front cross member 126 of the frame 20 as by clamp means 168. Thus, the cylinder is anchored to the frame.

The assembly includes a piston having a piston rod 170 which projects toward the right hand side of the machine (left hand side as seen in FIGS. 5 and 8). To the free or outer end of the piston rod 170 is rigidly affixed a plate 172 which has portions projecting both above and below the piston rod proper. To the lower portion is anchored, at 174, one end of a cable 176 which extends toward the left hand side of the machine, at which point it enters through an opening 177 (FIG. 3) in the inner side wall 131 of the left hand support structure 179. The cable is thence trained about a sheave 179 and thence extends forwardly at 181 over another sheave 183 and thence downwardly for connection at 185 to the left hand lower link 157. The sheaves 179 and 183 are located respectively on upright and transverse axes and may be regarded as rear and front guide means for the flexible element made up by the cable 176. It will thus be seen that an extension of the cylinder and piston assembly 124 will cause the piston 170 to move toward the right hand of the machine (to the left hand as seen in FIG. 5), thus drawing the cable 176 rearwardly and to the right and exerting a lifting force on the left hand link 157. Since this link is connected to or carries the left hand portion of the header, the header will of course be raised. Exhaust of fluid from the left hand end of the cylinder and piston assembly 124 will allow the header to descend by its own weight. For the purpose of equalizing the lifting of the header, a second flexible element in the form of a cable 178 is anchored at its forward end 180 to a portion of the right hand lower header link 156 (FIG. 5) and extends thence upwardly over forward guide or sheave means 182 and thence around sheave means (not shown) comparable to the sheave or guide means 179 as to structure and location, it being understood that the inner side wall 130 of the right hand structure 128 is similarly apertured to accommodate passage of the cable into and out of the right hand structure compartment as it extends from the right hand lower header link 156 to its connection with the force-exerting device or cylinder and piston assembly 124. The connection in this case includes an anchor at 184 to the piston rod member 172, but the cable is looped around a sheave 186 journalled on the frame 20 at the left hand end of the cylinder and piston assembly 124 (right hand end as seen in FIG. 5). The mounting of the sheave 186 is immaterial; that is, it could be connected to the cylinder 166 or it could be mounted directly on the transverse member 126. Of significance is the fact that the cable 178 is trained about the sheave 186 and is then brought back to its connection at 184 to the member 172 on the piston rod 170. Hence, as the cylinder and piston assembly is expanded to move the piston rod 170 toward the right hand side of the machine, both cables 176 and 178 are tensioned and both operate to raise their respective links 156 and 157, thus equalizing lifting of the header, which of course pivots about its pivotal connections to the frame 20 as established by the several links 156, 157, 160 and 161. Any suitable valve means may be used for controlling the cylinder and piston assembly 124 and it will be clear that when such valve is in its closed position, the fluid in the cylinder will be hydraulically locked and therefore the adjusted position of the header will be maintained. It is just as obvious that opening of the valve to exhaust the cylinder will enable the header to descend by its own weight.

As will be clear from FIG. 3, the vertical dimension of the gear housing 141 is such that it does not occupy the whole of the compartment 139. This therefore allows room for the provision of brackets at 187 and 189 for mounting the rear and front guide sheaves 179 and 183, respectively, these being located in the upper part or space of the compartment above the portion of the compartment occupied by the gear housing 141. It will be clear, of course, that a similar arrangement exists in the right hand structure 128. The upper forward portion of the structure 129 is shown as being substantially closed by a removable cover plate 191, the right hand counterpart of which appears at 190 in FIG. 5.

The adjusting means for raising and lowering the harvester relative to the frame or chassis 20 has already been described as including the force-exerting device 124 and the cable connections 176 and 178 to the harvester via the harvester lower supporting links 156 and 157. In addition, the means for controlling the position of the harvester includes counterbalancing means, here taking the form of right and left hand units located and mounted respectively in the compartments afforded in the right and left hand wheel support structures 128 and 129. The left hand unit is shown in detail and the presence of the right hand unit is supported on the basis of its obvious similarity to the left hand unit.

The left hand counterbalancing unit is indicated in its entirety by the numeral 193. This unit comprises a forward support or bracket 195 which spans the side walls or plates 131 and 133 and which is selectively positionable therein as to fore and aft location as by a pair of cap screws 197 which may be selectively passed through different sets of apertures 199 afforded in the plates or walls 131 and 133. Seated against the rear face of the bracket or support 195 are a pair of parallel fore and aft extending compression springs 201 which abut at their rear ends against a transverse plate 203 which is in turn rigidly secured to the rear ends of the fore and aft extending interior tubular members 205 which are coaxially received respectively by the springs 201 and which are further respectively telescopically received by exterior tubular members 207 which may be secured at their forward ends to the bracket or support 195. It will be clear that the assembly made up of the cross plate 203 and interior tubes 205 is movable fore and aft relative to the assembly made up by the support 195 and exterior tubes 207. This assembly operates normally in extension because of the springs 201. Connected to the cross plate 203 and extending forwardly respectively through the tubular structures 205–207, 205–207 are a pair of flexible elements in the form of cables 209. These extend forwardly and are trained over the previously described sheave or guide means 183 and extend thence downwardly for connection at 211 to the lower left hand harvester support link 157. The two cables 209 in the area between the sheave means 183 and the link 157 are parallel to that portion of the cable 176 that occupies the same area, as best seen in FIG. 5. The counterbalance unit thus exerts a rearward force tending to assist the upward force exerted by the force-exerting device or cylinder and piston assembly 124.

A similar unit, as already mentioned, is provided for the right hand side of the machine, and this unit, like the left hand unit, is housed within the associated wheel support structure, in this case the structure 128. The identity of structure will be readily apparent from the presence in FIG. 5 of a pair of counterbalance or assist cables 210 which are trained over the front sheave means 182 and which are anchored at 212 to the lower right hand harvester support link 156.

The provision of the right and left hand support structures 128 and 129, and the compartmentation afforded thereby, readily accommodates the wheel-supporting gear housings 140 and 141, along with the counterbalance units and the sheave or guide means for the cables. The force-exerting device 124 is conveniently and compactly located on the front side of the front cross member 126 of the frame 20. In addition, the support structures 128 and 129 afford means for mounting the harvester platform via the links 156, 157, 160 and 161. At the same time, the drive for the wheels is accommodated by the wheel support structures, since the apertures in the inner walls thereof accept the forwardly and oppositely and outwardly angling drive shafts 104 and 105, which is significant from the standpoint of enabling the power source to be located rearwardly of the forward end of the machine and at the same time to transmit drive forwardly and downwardly, it being observed also that the shafting 104 and 105 is below the level of the top of the frame 20 and therefore is out of the way of the operator's station.

It should be observed that when the header is in operating position, the weight thereof is counterbalanced by the spring units or assemblies 193 and that at the right-hand side of the machine so that the header may float over uneven terrain, and in a relatively low operating position of the header the lifting cables 176 and 178 are slack. In more elevated operating positions, the cables 176 and 178 will be taut in tension and thus establish a downward limit on movement of the header; although, the cables, being flexible, of course permit the header to rise when it encounters a high area in the field. If desired, the cables 176 may be adjusted to establish a downward limit for even said relatively low position of the header. When the header is raised to transport position, the necessity for floating disappears and the weight of the header may be carried entirely by the lift mechanism 124–176–178.

Features in addition to those just enumerated and in addition to those that will have occurred during the general description, as well as others that will occur to those versed in the art, are readily achieved by the preferred embodiment of the invention illustrated. However, these and other features may be just as easily exploited in variations of the preferred embodiment disclosed, all of which will occur without departure from the spirit and scope of the invention.

What is claimed is:

1. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a compartment and a gear box carried within said compartment, each gear box having a transverse wheel shaft projecting exteriorly of its compartment and a fore-and-aft input shaft within its compartment, and each inner wall having a through aperture therein leading to the respective input shaft; a pair of wheels connected respectively to and driven by the wheel shafts; a power source on the frame including a pair of power shafts laterally intermediate and rearwardly of the wheel support structures; a pair of drive shaft means connected respectively to the power shafts and angled forwardly and oppositely outwardly and extending respectively through said inner side wall apertures and connected respectively to said input shafts.

2. The invention defined in claim 1, including: a harvester device disposed ahead of the wheel supports; means mounting said device on the frame, including a pair of lower fore-and-aft links connected to said device and respectively to lower portions of said structures and a pair of upper links connected to said device and respectively to upper portions of said structures; means for adjusting the harvester device vertically relative to the frame and via the lower links, including guide means respectively in the compartments, a force-exerting device on the frame intermediate the compartments and a pair of flexible elements connected respectively to the lower links, trained respectively about said guide means and connected to said force-exerting device, each of said structures having openings therein to accommodate its element between its guide means and the associated link and between its guide means and the force-exerting device.

3. The invention defined in claim 2, including: counterbalance means for the harvester device, including a pair of counterbalance units, one in each compartment, and a pair of tension elements connected respectively between the lower links and the units.

4. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a compartment; a pair of wheels disposed respectively adjacent to but exteriorly of the compartments; means journalling the wheels respectively on said structures; a harvester disposed ahead of the frame; means mounting the harvester on the frame for relative vertical movement; and means for vertically adjusting the harvester, including guide means respectively within the compartments, a force-exerting device on the frame intermediate said structures, and a pair of flexible elements connected to said device and extending transversely oppositely therefrom to pass respectively about said guide means and thence forwardly respectively from said guide means to the harvester and having connections to said harvester, said structures having openings therein to enable the flexible elements to enter and leave the compartments in passing around the respective guide means.

5. The invention defined in claim 4, including: a pair of counterbalance units carried respectively within the compartments and having forwardly extending connections to the harvester, said structures respectively having openings to accommodate said connections.

6. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a compartment; a pair of wheels disposed respectively adjacent to but exteriorly of the compartments; means journalling the wheels respectively on said structures; a harvester disposed ahead of the frame; means mounting the harvester on the frame for relative vertical movement; a pair of counterbalance units carried respectively within the compartments and having forwardly extending connections to the harvester, said structures respectively having openings to accommodate said connections.

7. The invention defined in claim 6, in which: each unit is adjustably mounted in its compartment.

8. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a forwardly opening compartment; a pair of wheels disposed respectively adjacent to but exteriorly of the compartments; means journalling the wheels respectively on said structures; a harvester disposed ahead of the frame; means mounting the harvester on the frame for relative vertical movement; and means for vertically adjusting the harvester, including a force-exerting device carried by the frame laterally intermediate the support structures; a pair of cables connected to said device and extending transversely oppositely therefrom toward said structures, each side wall having an opening therein and each cable extending through said opening, into the associated compartment and forwardly out of said compartment toward and connected to the harvester, and a pair of guides, one in each compartment and adjacent to said opening for guiding the cable laterally through the opening and forwardly through the compartment.

9. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a compartment and a gear box carried within said compartment, each gear box having a transverse wheel shaft projecting exteriorly of its compartment, each gear box occupying a lower portion of its compartment so as to afford an upper space in said compartment and each compartment opening forwardly from its upper space; a pair of wheels connected respectively to the wheel shafts; a harvester ahead of said structures; means mounting the harvester on the frame for relative vertical movement; a pair of counterbalance units disposed respectively in the compartments in the upper spaces thereof above the respective gear boxes, each unit including a fore-and-aft spring device mounted on and between the associate side walls; and a pair of force-transmitting elements connected respectively to the units and extending forwardly and exteriorly of the compartments and connected to the harvester.

10. The invention defined in claim 9, in which: each element includes a cable and each gear box carries a guide over which its cable is trained.

11. The invention defined in claim 9, in which: each unit is adjustable fore-and-aft in its compartment.

12. An agricultural vehicle, comprising: a fore-and-aft main frame having a transverse front end portion spaced above the ground and a pair of transversely spaced apart and alined wheel support structures rigidly secured to and depending from said portion, each structure including a box-like part having inner and outer, upright, closely transversely spaced apart fore-and-aft side walls affording a forwardly opening compartment, each inner side wall having an aperture therethrough; a harvester ahead of the frame and carried thereby for relative vertical movement; and adjusting and counterbalance means on the frame for adjusting the harvester vertically, including a force-exerting device on the frame laterally intermediate said structures, rear guides respectively in the compartments respectively adjacent to said apertures, forward guides respectively in the compartments and respectively ahead of the rear guides, a pair of counterbalance units respectively in the compartments, first cable means connected to the fore-exerting device and extending laterally oppositely therefrom, respectively through the side wall openings, respectively around the rear guides, over the front guides and forwardly out of the respective compartments and connected to the harvester, and a pair of second cables, one connected to each counterbalance unit and extending forwardly over the associated forward guide and forwardly out of the compartment and connected to the harvester.

References Cited by the Examiner

UNITED STATES PATENTS

| | | | |
|---|---|---|---|
| 2,295,085 | 9/1942 | Keehn | 180—23 |
| 2,510,245 | 6/1950 | Munter | 56—23 |
| 2,530,941 | 11/1950 | Devirian | 180—26 |
| 2,631,421 | 3/1953 | Pierce | 56—23 |
| 2,674,082 | 4/1954 | Ryden | 56—192 |
| 2,677,225 | 5/1954 | Ommoodt | 56—23 |
| 2,699,222 | 1/1955 | Van Doorne | 180—23 |
| 2,850,861 | 9/1958 | Miller | 56—23 |
| 2,908,126 | 10/1959 | Dyrdahl | 56—192 X |
| 2,936,840 | 5/1960 | White | 180—6.66 |
| 2,955,813 | 10/1960 | Hume | 56—208 X |

FOREIGN PATENTS 114,248   3/1918   Great Britain.

ABRAHAM G. STONE, *Primary Examiner.*

CARL W. ROBINSON, ARNOLD RUEGG, *Examiners.*

ALDRICH F. MEDBERY, J. O. BOLT,
*Assistant Examiners.*